(12) United States Patent
Chen

(10) Patent No.: US 9,381,627 B2
(45) Date of Patent: Jul. 5, 2016

(54) TOOL BIT ADAPTER HAVING A POSITION-LIMIT ROD

(71) Applicant: GOOD YEAR HARDWARE CO., LTD., Changhua (TW)

(72) Inventor: Tsai-Ching Chen, Changhua (TW)

(73) Assignee: GOOD YEAR HARDWARE CO., LTD., Changhua (TW)

( * ) Notice: Subject to any disclaimer, the term of this patent is extended or adjusted under 35 U.S.C. 154(b) by 183 days.

(21) Appl. No.: 14/249,957

(22) Filed: Apr. 10, 2014

(65) Prior Publication Data

US 2015/0202689 A1    Jul. 23, 2015

(30) Foreign Application Priority Data

Jan. 22, 2014  (TW) .............................. 103102348 A

(51) Int. Cl.
| | |
|---|---|
| B23B 31/107 | (2006.01) |
| B25B 23/00 | (2006.01) |
| B23B 31/00 | (2006.01) |
| B25B 23/12 | (2006.01) |

(52) U.S. Cl.
CPC ........... *B25B 23/0035* (2013.01); *B23B 31/003* (2013.01); *B23B 31/1071* (2013.01); *B25B 23/12* (2013.01); *B23B 2231/04* (2013.01); *Y10T 279/17196* (2015.01); *Y10T 279/3406* (2015.01); *Y10T 279/3481* (2015.01)

(58) Field of Classification Search
CPC .. B23B 31/003; B23B 31/04; B23B 31/1071; B25B 23/0035; Y10T 279/17145; Y10T 279/17196; Y10T 279/17752; Y10T 279/3406; Y10T 279/3481

See application file for complete search history.

(56) References Cited

U.S. PATENT DOCUMENTS

| | | | | |
|---|---|---|---|---|
| 6,199,872 B1 * | 3/2001 | Hasan | ................. | B23B 31/1071 279/155 |
| 6,270,085 B1 * | 8/2001 | Chen | ..................... | B23B 15/001 279/155 |
| 6,325,393 B1 * | 12/2001 | Chen | ..................... | B25B 15/001 279/155 |
| 6,637,755 B2 | 10/2003 | Chen et al. | | |
| 6,722,667 B2 * | 4/2004 | Cantlon | .................. | B23B 31/06 279/155 |
| 6,874,791 B2 * | 4/2005 | Chen | ................... | B23B 31/1071 279/14 |
| 6,953,196 B1 * | 10/2005 | Huang | ................ | B23B 31/1071 279/155 |
| 7,424,841 B2 * | 9/2008 | Liu | ........................ | B25B 15/001 279/22 |
| 7,448,302 B2 * | 11/2008 | Huang | ................ | B25B 23/0035 279/75 |
| 7,469,909 B2 * | 12/2008 | Strauch | ............... | B25B 23/0035 279/143 |

(Continued)

FOREIGN PATENT DOCUMENTS

DE    858924 C * 12/1952 .............. B23B 31/06

*Primary Examiner* — Eric A Gates

(74) *Attorney, Agent, or Firm* — Muncy, Geissler, Olds & Lowe, P.C.

(57) ABSTRACT

A tool bit adapter having a position-limit rod includes a base member including a cylindrical body defining a longitudinal receiving open chamber and radial through holes and a ball movably mounted in each radial through hole, an operating member, a first elastic member stopped between a retaining ring at the cylindrical body and the operating member, a pusher having a position-limit groove located in the periphery thereof, a position-limit rod mounted in the cylindrical body and projecting into the receiving open chamber and inserted into the position-limit groove and selectively stoppable at one of two opposite ends of the position-limit groove, a second elastic member stopped between the pusher and the cylindrical body, and one or multiple locating grooves formed in the pusher or a tool bit to be installed for receiving the balls.

6 Claims, 9 Drawing Sheets

(56) References Cited

U.S. PATENT DOCUMENTS

| | | | |
|---|---|---|---|
| 7,581,470 B1 * | 9/2009 | Huang | B25B 23/0035 279/22 |
| 7,891,275 B2 * | 2/2011 | Huang | B25B 23/0035 279/75 |
| 7,922,180 B2 * | 4/2011 | Meng | B25B 15/001 279/143 |
| 8,157,021 B2 * | 4/2012 | Chen | B23B 31/1071 173/29 |
| 8,550,471 B2 * | 10/2013 | Huang | B23B 31/06 279/22 |
| 8,622,401 B2 * | 1/2014 | Puzio | B23B 31/1071 279/30 |
| 8,876,120 B2 * | 11/2014 | Chen | B25B 15/001 279/128 |
| 9,156,147 B2 * | 10/2015 | Peters | B23B 31/10 |
| 2004/0026878 A1 * | 2/2004 | Chen | B25B 15/001 279/75 |
| 2009/0008886 A1 * | 1/2009 | Shu | B23B 31/06 279/103 |
| 2012/0326399 A1 * | 12/2012 | Lin | B23B 31/1071 279/75 |
| 2012/0326400 A1 * | 12/2012 | Lin | B23B 31/1071 279/75 |

* cited by examiner

TOOL BIT ADAPTER HAVING A POSITION-LIMIT ROD

BACKGROUND OF THE INVENTION

1. Field of the Invention

The present invention relates to hand tool technology and more particularly, to a tool bit adapter having a position-limit rod for hand tool.

2. Description of the Related Art

U.S. Pat. No. 6,637,755 discloses a chuck device for miniature tool bits, which includes a sleeve (20), a socket (10), a ball (14) received in between the sleeve (20) and each hole in the socket (10), and a pusher (30) mounted in the socket to stop against the balls. When installing a tool bit in the chuck device, insert the tool bit into the socket to push the pusher away from the balls. At this time, the sleeve can push the balls in direction toward the inside of the socket, forcing the balls into engagement with respective recesses in the miniature tool bit.

According to the aforesaid prior art technique, a C-ring (34) is mounted on the pusher (30); the socket provides a shoulder surface on the inside for stopping against the C-ring to keep the pusher in position. An elastic element 45 is received in the chamber 13 so that its first end is received in the second recess 32 of the pusher 30. Due to that the inner wall of the socket must be processed through a machining process, for example, turning process to provide the shoulder surface, the problems of increased cost and processing accuracy will be encountered. Further, the manufacturer can eliminate the lathe turning process by assembling two component parts to form the socket. However, assembling two component parts to form the socket relatively increases the cost and complicates the assembly process.

SUMMARY OF THE INVENTION

The present invention has been accomplished under the circumstances in view. It is the main object of the present invention to provide a tool bit adapter having a position-limit rod, which eliminates the problem of the use of a socket in the tool bit adapter in the aforesaid prior art technique that needs an extra machining process or assembling two component parts, thereby achieving the effects of cost-saving and resource-saving.

To achieve this and other objects of the present invention, a tool bit adapter having a position-limit rod for hand tool of the invention comprises a base member comprising a cylindrical body located at one end thereof, a receiving open chamber defined in the cylindrical body comprising, an orifice located in a front end of the cylindrical body in communication with the receiving open chamber, an internal small diameter portion formed of a front part of the receiving open chamber for receiving a tool bit that is inserted through the orifice for the insertion of a tool bit therethrough into the receiving open chamber, at least one through hole radially located in the cylindrical body in communication with the receiving open chamber, a ball movably mounted in each through hole, an annular groove extending around the periphery of the cylindrical body and a retaining ring mounted in the annular groove, an operating member slidably sleeved onto the cylindrical body and comprising an inside groove made in an annular shape and extending around an inside wall thereof, a pressure face made in an annular shape and extending around the inside wall thereof and facing toward the periphery of the cylindrical body and a locating ring located in a rear end thereof, a first elastic member sleeved onto the cylindrical body and stopped between the retaining ring and the operating member to impart an elastic force to the operating member in a predetermined direction relative to the cylindrical body, a pusher received in the receiving open chamber of the cylindrical body and slidable relative to the cylindrical body between a front end position and a rear end position and comprising a position-limit groove located in the periphery thereof, a position-limit rod mounted in the cylindrical body and projecting into the receiving open chamber and engaged into the position-limit groove and selectively stoppable at one of two opposite ends of the position-limit groove to stop the pusher in one of the front end position and the rear end position, and a second elastic member mounted in the receiving open chamber and stopped between the pusher and the cylindrical body to impart a forward pressure to the pusher relative to the cylindrical body, wherein at least one locating groove is located in one of the pusher and the tool bit to be installed in the tool bit adapter; the at least one ball in the at least one through hole is adapted for engaging the at least one locating groove. Thus, the invention eliminates the problem of the use of a socket in the tool bit adapter in the aforesaid prior art technique that needs an extra machining process or assembling two component parts, thereby achieving the effects of cost-saving and resource-saving.

Other advantages and features of the present invention will be fully understood by reference to the following specification in conjunction with the accompanying drawings, in which like reference signs denote like components of structure.

DETAILED DESCRIPTION OF THE INVENTION

Figure 1:
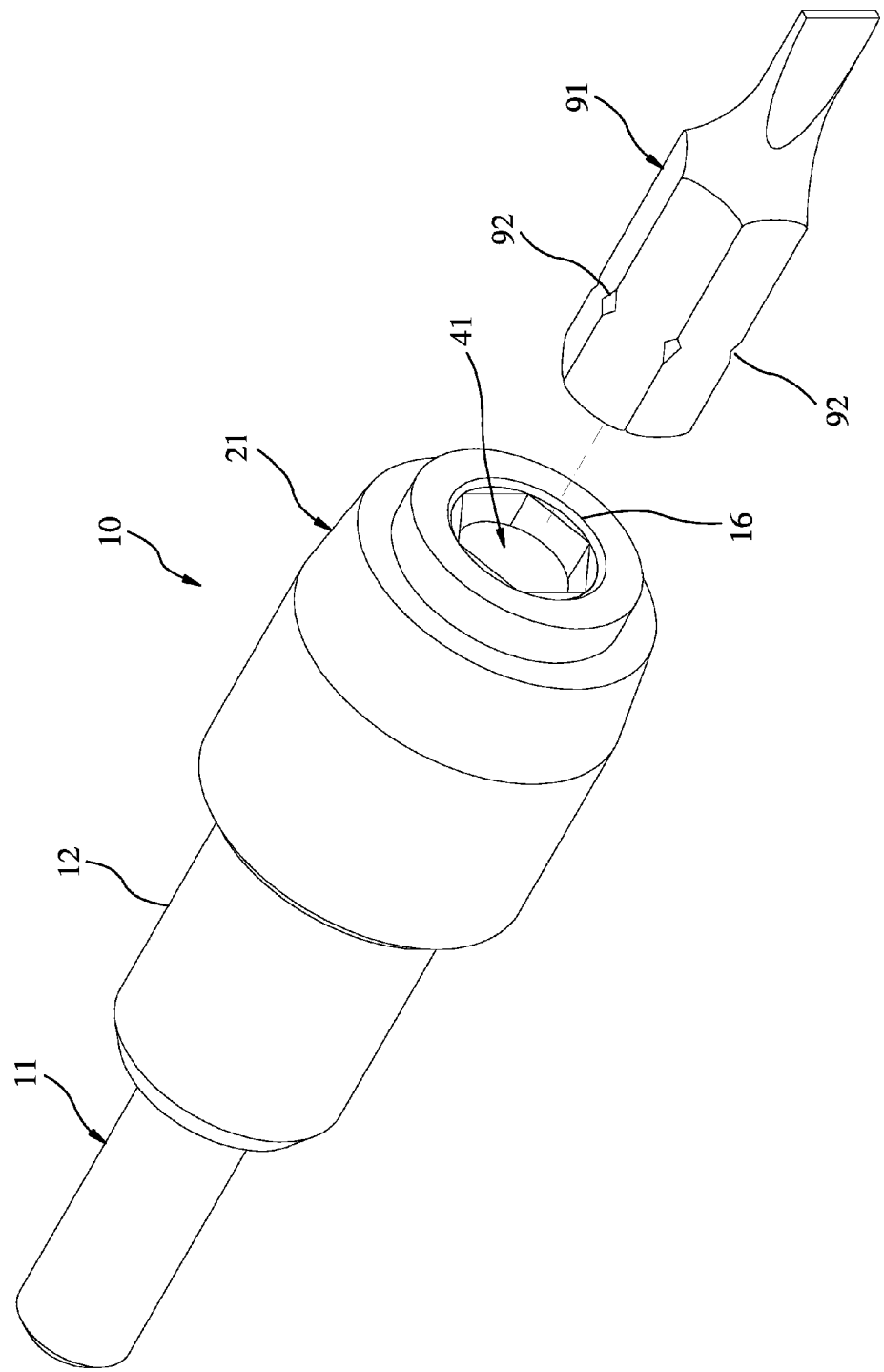
FIG. 1 is an elevational view of a tool bit adapter having a position-limit rod for hand tool in accordance with a first embodiment of the present invention.
Figure 2:
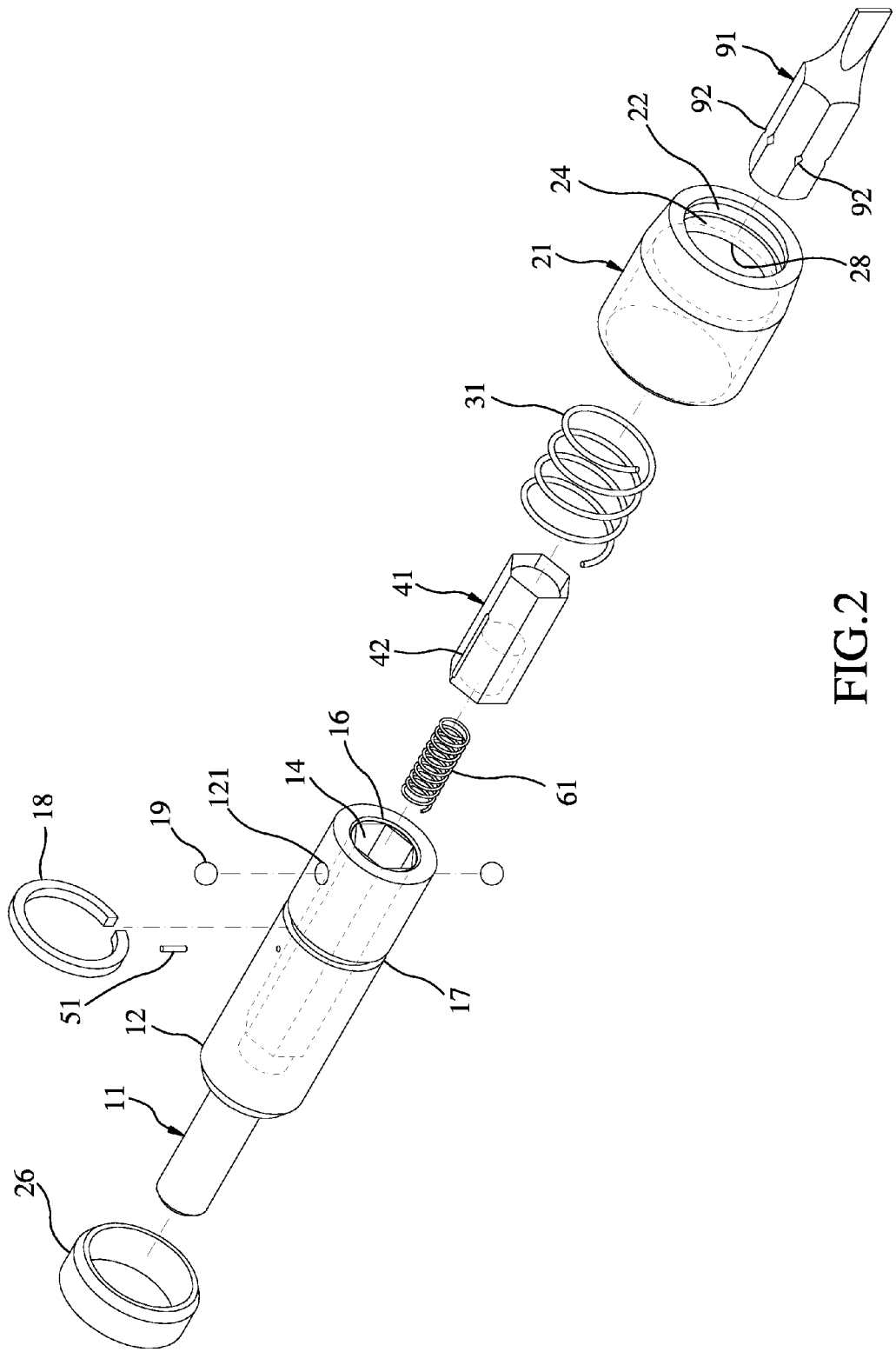
FIG. 2 is an exploded view of the tool bit adapter having a position-limit rod for hand tool in accordance with a first embodiment of the present invention.

Referring to FIGS. 1-6, a tool bit adapter 10 having a position-limit rod for hand tool for use in a hand tool to detachably secure a tool bit 91 in accordance with a first embodiment of the present invention is shown. The tool bit adapter 10 comprises a base member 11, an operating member 21, a first elastic member 31, a pusher 41, a position-limit rod 51, and a second elastic member 61.

The base member 11 comprises a cylindrical body 12 located at one end thereof, a receiving open chamber 14 longitudinally defined in the cylindrical body 12, an orifice 16 located in a front end of the cylindrical body 12 in communication with the receiving open chamber 14 for the insertion of a tool bit 91 therethrough into the receiving open chamber 14, at least one through hole 121 transversely cut through the peripheral wall of the cylindrical body 12 in communication with the receiving open chamber 14, a ball 19 received in each through hole 121, an annular groove 17 extending around the outer perimeter of the cylindrical body 12, and a retaining ring 18 fastened to the annular groove 17 around the cylindrical body 12. In this first embodiment, the base member 11 is a one-piece member; the number of the at least one through hole 121 and the number of the at least one ball 19 are plural.

The operating member 21 is a hollow member slidably sleeved onto the cylindrical body 12, comprising an inside groove 22 made in a front end thereof in an annular shape and extending around an inside wall thereof, and a pressure face 24 made in an annular shape and protruded from and extending around the inside wall and facing toward the cylindrical body 12. The operating member 21 further comprises a locating ring 26 located in an opposing rear end thereof. In this first embodiment, the pressure face 24 is disposed at a rear side relative to the inside groove 22; the locating ring 26 is adapted for stopping against the retaining ring 18 to limit the forward displacement of the operating member 21. The operating member 21 further comprises an inside shoulder surface 28 located on the inside wall thereof.

The first elastic member 31 is sleeved onto the cylindrical body 12 and stopped between the operating member 21 and the retaining ring 18 to impart a forward pressure to the operating member 21. Actually, the first elastic member 31 is disposed at a front side relative to the retaining ring 18, and stopped with two opposite ends thereof against the retaining ring 18 and the shoulder surface 28 of the operating member 21 to impart a forward pressure to the operating member 21.

The pusher 41 is received in the receiving open chamber 14 of the cylindrical body 12 and slidable relative to the cylindrical body 12 between a front end position Pf and a rear end position Pr, comprising a position-limit groove 42 located in the periphery thereof. In this first embodiment, the position-limit groove 42 is a longitudinal groove extending along the length of the pusher 41.

The position-limit rod 51 is mounted in the peripheral wall of the cylindrical body 12 and projecting into the receiving open chamber 14 to interfere in the position-limit groove 42. Actually, the position-limit rod 51 can be moved with the base member 11 relative to the pusher 41 and stopped at one of two opposite ends of the position-limit groove 42 to achieve the desired position-limit effect.

The second elastic member 61 is mounted in the receiving open chamber 14 and stopped between the pusher 41 and the cylindrical body 12 to impart a forward pressure to the pusher 41 relative to the cylindrical body 12.

After understanding the structural features of the first embodiment of the present invention, the operation of this first embodiment is outlined hereinafter.

Figure 3:
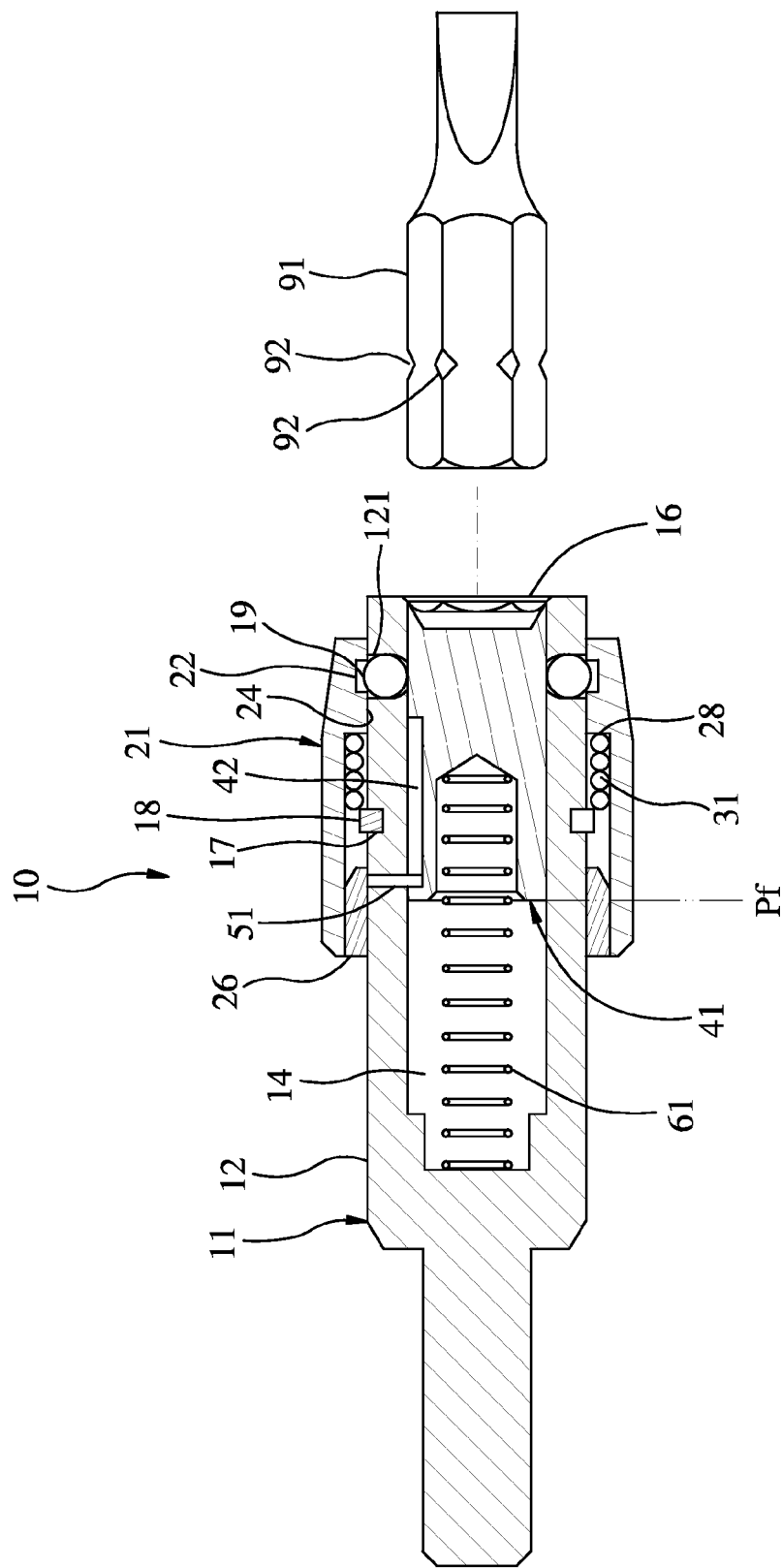
FIG. 3 is a sectional view taken along line 3-3 of FIG. 1.

Referring to FIG. 3, before installation of a tool bit 91 in the tool bit adapter 10, the pusher 41 is in the front end position Pf, and the second elastic member 61 provides a forward pressure to the pusher 41. At this time, the position-limit rod 51 is engaged into the position-limit groove 42 and stopped at one end of the position-limit groove 42 to prohibit the pusher 41 from moving further forward relative to the base member 11, and therefore the pusher 41 is kept in the front end position Pf. At the same time, the inside groove 22 faces toward the through hole 121, and the balls 19 are radially outwardly forced by the peripheral wall of the pusher 41 into the inside groove 22 to lock the operating member 21 to the base member 11.

Figure 4:
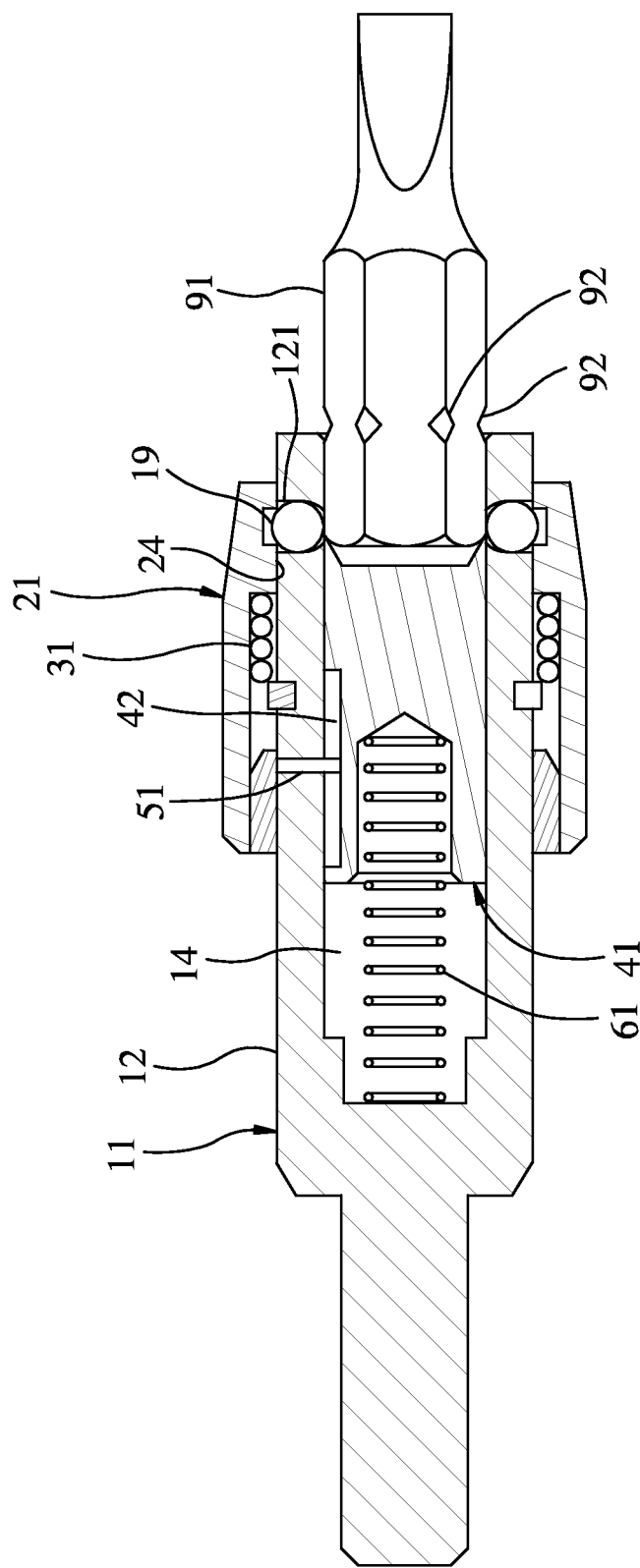
FIG. 4 is a schematic drawing of the first embodiment of the present invention, illustrating the pusher moved backwards relative to the cylindrical body of the base member.
Figure 5:
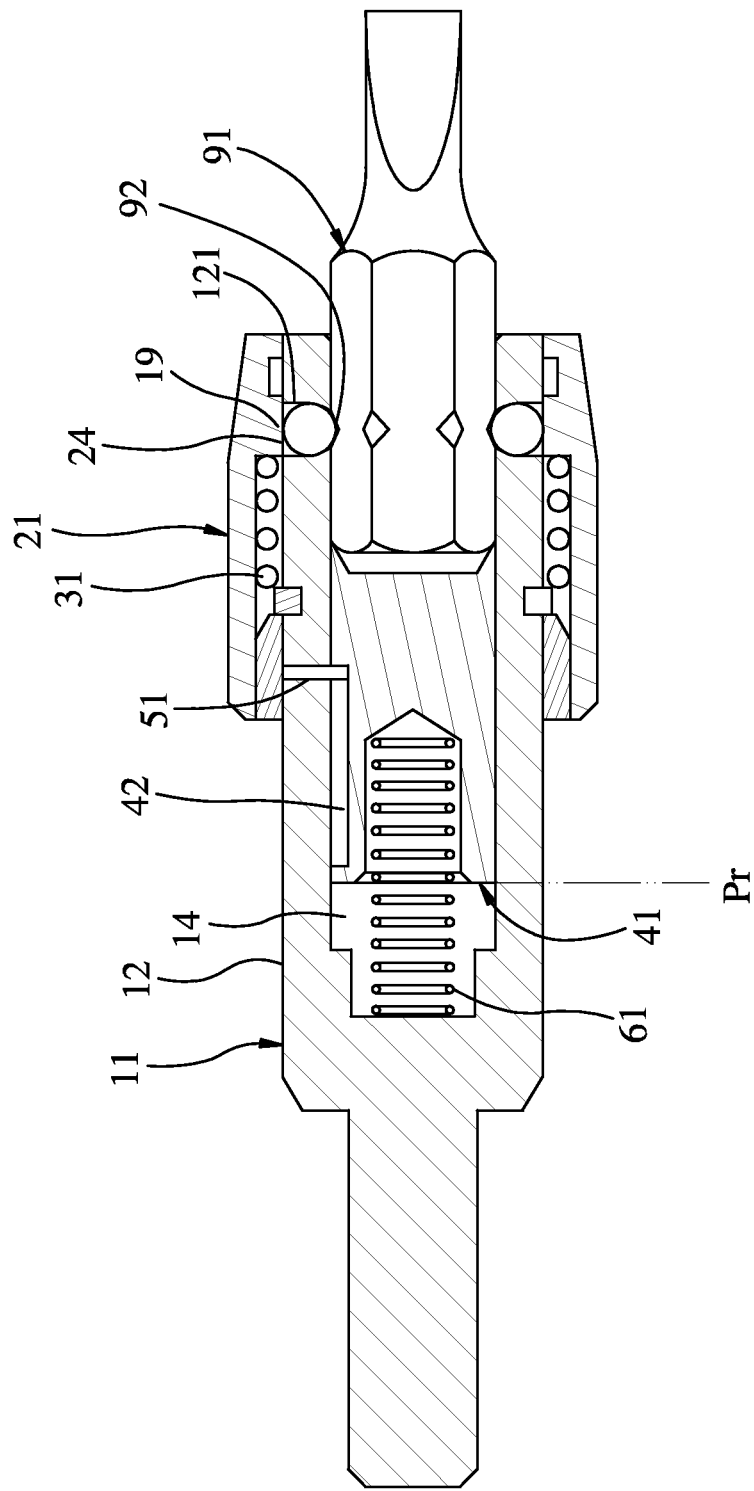
FIG. 5 corresponds to FIG. 4, illustrating the inserted tool bit locked to the cylindrical body of the base member.

Referring to FIGS. 3-5, when fastening a tool bit 91 to the tool bit adapter 10, insert the tool bit 91 through the orifice 16 into the receiving open chamber 14 of the cylindrical body 12 to push the pusher 41 backwardly away from the front end position Pf toward the rear end position Pr, thereby compressing the second elastic member 61. When reached the rear end position Pr, the position-limit rod 51 is stopped the other end of the position-limit groove 42 to prohibit the pusher 41 from moving further backward relative to the base member 11, and therefore the pusher 41 is kept in the rear end position Pr shown in FIG. 5. At the same time, the at least one, for example, multiple locating grooves 92 of the tool bit 91 are respectively aimed at the through holes 121, and the operating member 21 is forced forward by the first elastic member 31, moving the balls 19 radially inwardly toward the receiving open chamber 14 into the respective locating grooves 92. At this time, the operating member 21 is continuously moved forward, causing the pressure face 24 of the operating member 21 to hold down the balls 19 in the respective locating grooves 92 of the tool bit 91. At this time, the tool bit 91 is locked to base member 11 at the front side relative to the pusher 41.

Referring to FIGS. 4 and 5 again, when wishing to detach the tool bit 91 from the tool bit adapter 10, pull the operating member 21 backwards to the position where the inside groove 22 of the operating member 21 is kept in alignment with the through holes 121.

At this time, the balls 19 are released from the pressure of the pressure face 24 and become movable, i.e., the pusher 31 is unlocked and pushed forwards by the second elastic member 61 from the rear end position Pr to the front end position Pf. At this time, the user can remove the tool bit 91 from the tool bit adapter 10, and the tool bit adapter 10 is returned to the state shown in FIG. 3.

It can thus be seen that, in the aforesaid first embodiment of the present invention, when the pusher 41 is moved to the front end position Pf or rear end position Pr, the position-limit rod 51 is stopped at one of two opposite ends of the position-limit groove 42 to keep the pusher 41 in position. Thus, it is not necessary to provide a shoulder surface 28 in the cylindrical body 12 for stopping the pusher in position, i.e., it is not necessary to apply an additional machining process to the inside wall of the cylindrical body 12. Further, by means of using the position-limit rod 51 to match with the position-limit groove 42 for stopping the pusher 41 in position, it is not necessary to make the base member 11 in a two-part design, and therefore the invention eliminates the problem of the use of a socket in the tool bit adapter in the aforesaid prior art technique that needs an extra machining process or assembling two component parts, thereby achieving the effects of cost-saving and resource-saving.

In the aforesaid first embodiment, the number of the at least one through hole 121, the number of the at least one ball 19 and the number of the locating groove 92 are plural. However, the first embodiment can also be configured having only one single through hole 121 and one single ball 19, and the tool bit 91 can be configured having only one single locating groove 92. In this case, when loading the tool bit 91, the tool bit 91 must be moved to the position where the locating groove 92 is aimed at the through hole 121 so that the ball 19 can be forced into engagement with the locating groove 92 to lock the tool bit 1.

Figure 6:
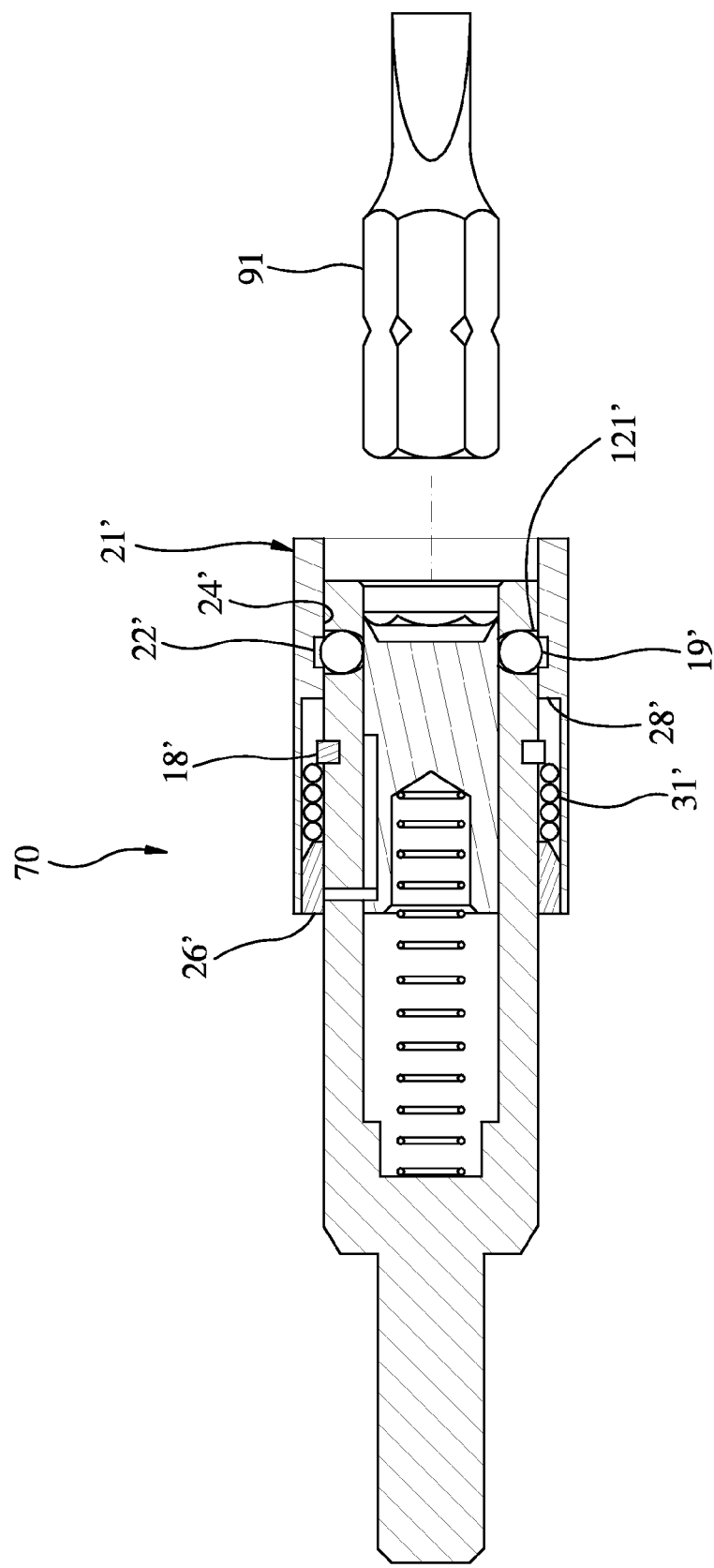
FIG. 6 is a schematic sectional view of a tool bit adapter having a position-limit rod in accordance with a second embodiment of the present invention.
Figure 7:
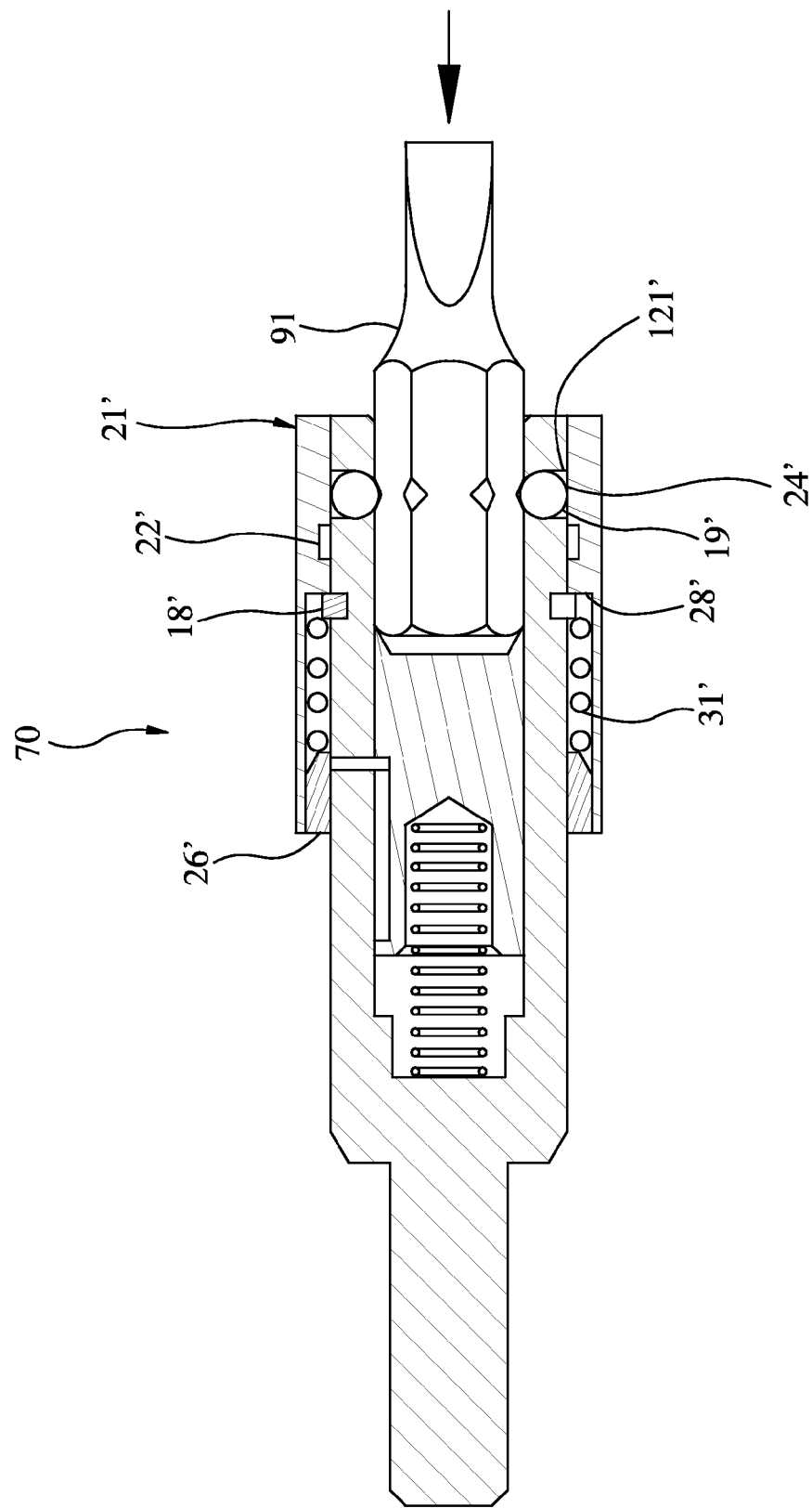
FIG. 7 is a schematic applied view of the second embodiment of the present invention, illustrating a tool bit installed in the tool bit adapter.

Referring to FIGS. 6 and 7, a tool bit adapter 70 in accordance with a second embodiment of the present invention. This second embodiment is substantially similar to the aforesaid first embodiment with the exceptions as described below:

The pressure face 24' is disposed at a front side relative to the inside groove 22'.

The operating member 21' comprises a shoulder surface 28' located in the inside wall thereof; the first elastic member 31' is disposed at a rear side relative to the retaining ring 18', and has its two opposite ends respectively stopped against the retaining ring 18' and the locating ring 26' off the operating member 21' to impart a backward pressure to the operating member 21'.

The shoulder surface 28' is adapted for stopping against the retaining ring 18' to prohibit the operating member 21' from further backward displacement.

In this second embodiment, the operating direction of the operating member 21' is revered to the aforesaid first embodiment, i.e., when wishing to detach the inserted the tool bit 91, push the operating member 21' forward to keep the inside groove 22' in alignment with the through holes 121' for enabling the balls 19' to be disengaged from the tool bit 91.

The other part of the structure of this second embodiment and its effects are same as the aforesaid first embodiment, and therefore, no further detailed description in this regard is necessary.

Figure 8:
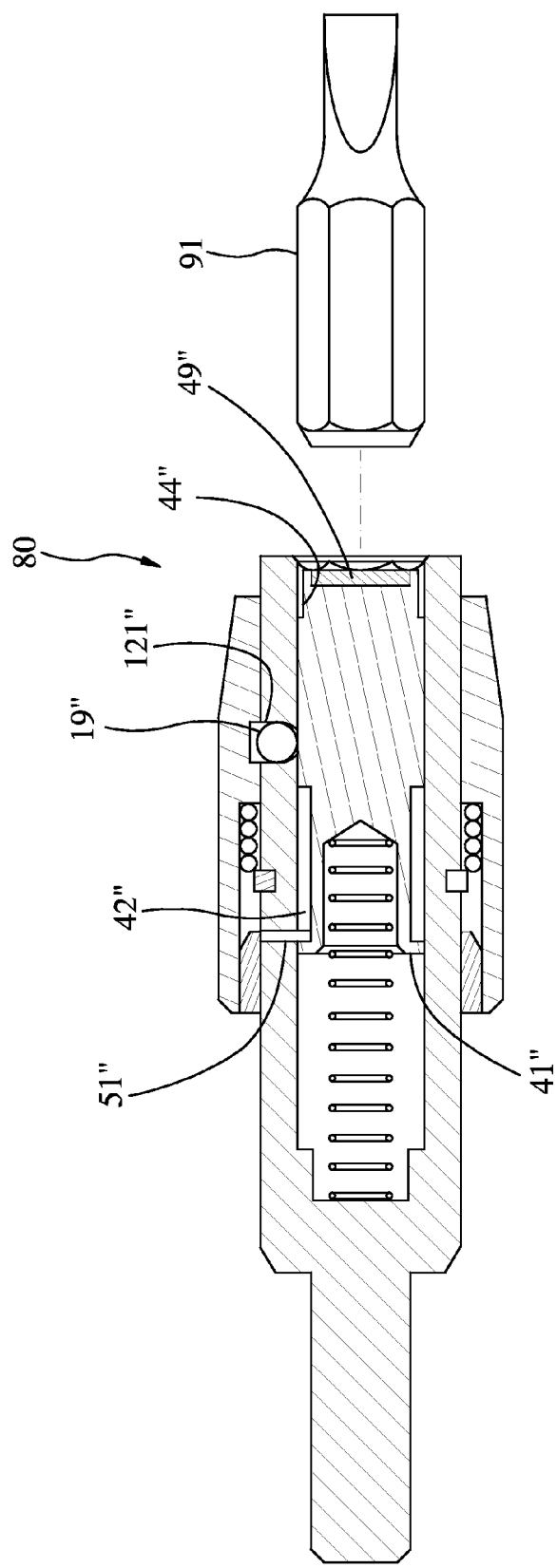
FIG. 8 is a schematic sectional view of a tool bit adapter having a position-limit rod in accordance with a third embodiment of the present invention.
Figure 9:
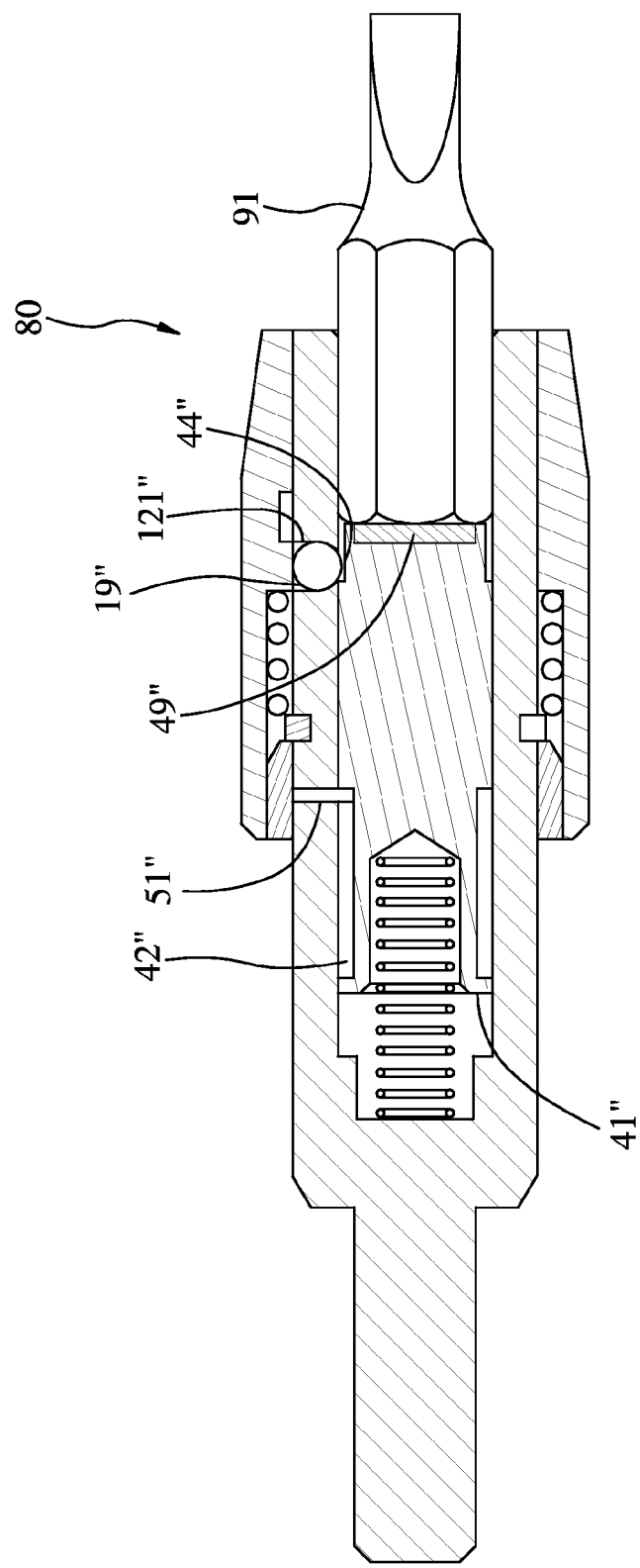
FIG. 9 is a schematic applied view of the third embodiment of the present invention, illustrating a tool bit installed in the tool bit adapter.

Referring to FIGS. 8 and 9, a tool bit adapter 80 in accordance with a third embodiment of the present invention. This third embodiment is substantially similar to the aforesaid first embodiment with the exceptions as described below:

The position-limit groove 42" is an annular groove extending around the periphery of the pusher 41".

The number of the at least one through hole 121" is 1, and therefore the number of the at least one ball 19" is also 1 and mounted in the through hole 121"; the pusher 41" comprises at least one, for example, one locating groove 44" located in the periphery thereof for receiving the ball 19". In this embodiment, the tool bit 91 needs not to provide any locating groove.

Further, the pusher 41" comprises a magnet 49" located at the front end thereof for securing the tool bit 91 by magnetic attraction.

During installation of the pusher 41", the pusher 41" can be directly installed without needing to aim at the position-limit rod 51", i.e., no directionality in installation. Thus, this third embodiment facilitates quick installation of the pusher. Further, by means of designing the at least one locating groove 44" in the pusher 41", it is not necessary to design at least one locating groove in every tool bit, reducing the tool bit manufacturing cost.

The other part of the structure of this third embodiment and its effects are same as the aforesaid first embodiment, and therefore, no further detailed description in this regard is necessary.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tool bit adapter, comprising:
a base member comprising a cylindrical body located at one end thereof, a receiving open chamber defined in said cylindrical body comprising, an orifice located in a front end of said cylindrical body in communication with said receiving open chamber, an internal small diameter portion formed of a front part of said receiving open chamber for receiving a tool bit that is inserted through said orifice for the insertion of a tool bit therethrough into said receiving open chamber, at least one through hole radially located in said cylindrical body in communication with said receiving open chamber, a ball movably mounted in each said through hole, an annular groove extending around the periphery of said cylindrical body, and a retaining ring mounted in said annular groove;
an operating member slidably sleeved onto said cylindrical body, said operating member comprising an inside groove made in an annular shape and extending around an inside wall thereof, a pressure face made in an annular shape and extending around the inside wall thereof and facing toward the periphery of said cylindrical body, and a locating ring located in a rear end thereof;
a first elastic member sleeved onto said cylindrical body and stopped between said retaining ring and said operating member to impart an elastic force to said operating member in a predetermined direction relative to said cylindrical body;
a pusher received in said receiving open chamber of said cylindrical body and slidable relative to said cylindrical body between a front end position and a rear end position, said pusher comprising a position-limit groove;
a position-limit rod mounted in said cylindrical body and projecting into said receiving open chamber and engaged into said position-limit groove and selectively stoppable at one of two opposite ends of said position-limit groove to stop said pusher in one of said front end position and said rear end position; and
a second elastic member mounted in said receiving open chamber and stopped between said pusher and said cylindrical body to impart a forward pressure to said pusher relative to said cylindrical body;
wherein at least one locating groove is located in one of said pusher and the tool bit to be installed in said tool bit adapter; said at least one ball in said at least one through hole is adapted for engaging said at least one locating groove,
wherein the position-limit groove is monolithically and directly recessed on a periphery of said pusher, and
wherein the position-limit rod is penetrated through a periphery wall of the cylindrical body of the base member in a way that the position-limit rod has a bottom end engaged into said position-limit groove, and a top end that does not protrude over an outer surface of the periphery wall of the cylindrical body.

2. The tool bit adapter as claimed in claim 1, wherein said cylindrical body is formed integral with a part of said base member, and said base member is a one-piece member.

3. The tool bit adapter as claimed in claim 1, wherein said pressure face is disposed at a rear side relative to said inside groove; said locating ring is adapted for stopping against said retaining ring to limit the forward displacement of said operating member; said operating member comprises a shoulder surface located in the inside wall thereof; said first elastic member is disposed at a front side relative to said retaining ring, having two opposite ends thereof respectively stopped against said retaining ring and said shoulder surface of said operating member to impart a forward pressure to said operating member relative to said cylindrical body.

4. The tool bit adapter as claimed in claim 1, wherein said pressure face is disposed at a front side relative to said inside groove; said operating member comprises a shoulder surface located in the inside wall thereof; said first elastic member is disposed at a rear side relative to said retaining ring, having two opposite ends thereof respectively stopped against said retaining ring and said locating ring of said operating member to impart a rearward pressure to said operating member relative to said cylindrical body; said shoulder surface is adapted for stopping against said retaining ring to limit the forward displacement of said operating member.

5. The tool bit adapter as claimed in claim 1, wherein said position-limit groove extends around the periphery of said pusher.

6. The tool bit adapter as claimed in claim 1, wherein said position-limit groove extends longitudinally along the length of said pusher.

* * * * *